United States Patent [19]

Moy

[11] Patent Number: 4,819,130
[45] Date of Patent: Apr. 4, 1989

[54] FAIL-SAFE RADIO FREQUENCY SUPPRESSOR

[76] Inventor: Harold Moy, 3622 Worthington Ct., Rochester Hills, Mich. 48309

[21] Appl. No.: 129,543

[22] Filed: Dec. 7, 1987

[51] Int. Cl.⁴ .............................................. H01G 4/42
[52] U.S. Cl. .................................... 361/302; 333/182; 361/270
[58] Field of Search ................................ 361/301–302, 361/306–308, 310, 143, 271, 268, 270; 333/182, 183; 29/25.42, 25.41; 455/296, 297; 318/445

[56] References Cited

U.S. PATENT DOCUMENTS

| | | | |
|---|---|---|---|
| 3,893,019 | 7/1975 | King et al. | 323/905 |
| 3,986,084 | 10/1976 | Carter et al. | 361/302 |
| 4,109,288 | 8/1978 | Beronson | 361/35 |
| 4,291,362 | 9/1981 | MacMillan et al. | 361/302 |
| 4,348,709 | 9/1982 | Mauk et al. | 361/93 |
| 4,380,224 | 4/1983 | Van Siclen, Jr. | 123/602 |
| 4,445,490 | 5/1984 | Van Siclen, Jr. | 307/597 |
| 4,725,806 | 2/1988 | Chamberlin | 361/405 |

Primary Examiner—William M. Shoop, Jr.
Assistant Examiner—David Martin
Attorney, Agent, or Firm—Krass & Young

[57] ABSTRACT

A radio frequency suppression device is adapted to provide a current path having no solder joints disposed in series therewith as well as no components prone to fail in an "open" mode. The R.F. suppression device is adapted to continue to provide power to critical systems such as an automotive fuel pump, even in the event of failure of the R.F. suppression circuit.

17 Claims, 2 Drawing Sheets

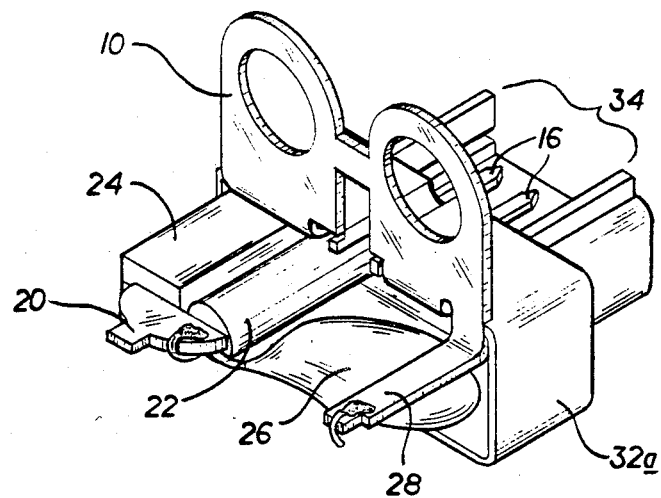
FIG. 4
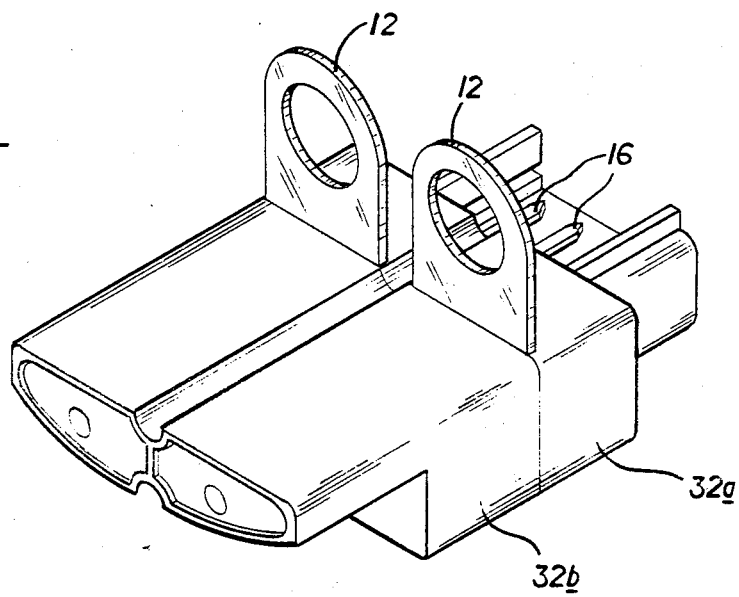
FIG. 5
FIG. 6
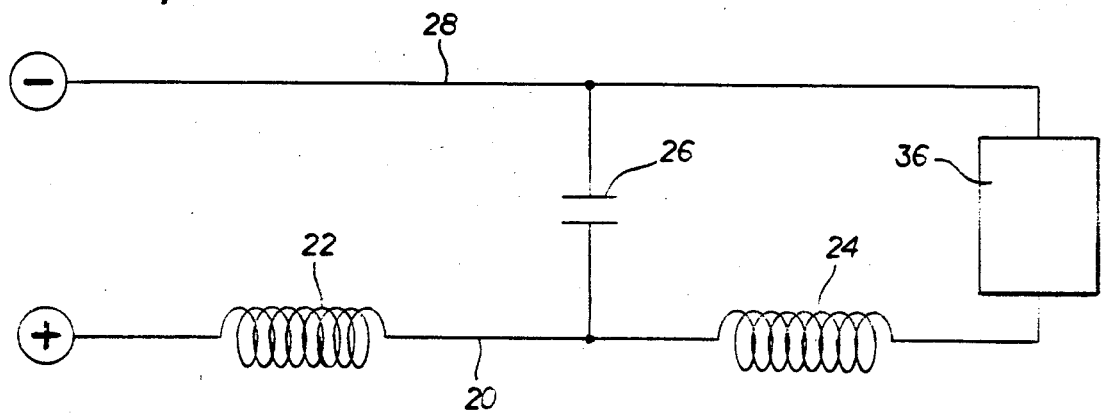

FAIL-SAFE RADIO FREQUENCY SUPPRESSOR

FIELD OF THE INVENTION

This invention relates generally to suppression of electro-magnetic noise. In particular, the invention relates to a radio frequency suppression device and a method for its manufacture, which device is adapted to operate in a fail-safe mode.

BACKGROUND OF THE INVENTION

As our society becomes more technologically sophisticated, electromagnetic noise pollution is becoming a growing problem. By electromagnetic noise pollution is meant unwanted electromagnetic signals, typically in the radio frequency range, which can interfere with the functioning of other electronic devices. Presently there are a great number of devices which generate electromagnetic noise pollution and a large number of devices sensitive to stray signals. For example, small DC motors are widely used in many consumer items and such motors can generate stray radio frequency signals. These signals can interfere with the operation of audio systems as well as radio controlled devices.

Motor vehicles are a prime example of the problems of electromagnetic noise pollution. Motor vehicles of present manufacture include a great number of small direct current operated motors as for example the motor powering the fuel pump. Such motors are capable of generating stray radio frequency signals. The problem is further exacerbated by the fact that audio systems in automobiles are presently more sophisticated and consumers expect high sound reproduction fidelity. These sensitive, high fidelity systems are prone to radio frequency interference from electric motors.

One solution to this problem has been to include noise reduction circuitry in the radio receivers themselves and much technology is devoted to this concept. For example, U.S. Pat. No. 3,189,824 discloses a mobile radio system having noise reduction capability.

A preferable solution is to limit the production of radio frequency noise at its source. Such noise reduction may be accomplished by various R.F. filtering or suppression circuits well-known to those of skill in the electronics arts. A typical circuit of this type includes one or more R.F. chokes which inhibit the passage of a high frequency electronic signal therethrough while allowing direct current or relatively low frequency (i.e., up to approximately 60 cycles) signals therethrough. Such device usually further include a capacitor which impedes the flow of direct or low frequency current while allowing high frequency current to pass therethrough. By appropriately disposing these particular elements, dc or low frequency energy may be supplied to a device such as a motor while short circuiting or shunting radio frequency noise emanating from that device so as to prevent it from entering the power distribution network.

The fuel pump is one critical source of radio frequency noise in an automobile and consequently various steps have been taken to include noise suppression circuitry in association therewith. While such devices have been found to function adequately in reducing noise they do introduce a new failure mode into vehicle operation. Of necessity, such radio frequency suppression circuitry includes a plurality of components affixed by soldered joints as well as a capacitor. While solder generally effects low resistance durable joints, solder joints can become a source of high resistance or open points in the circuit. Similarly, capacitors generally fail in an "open" mode wherein they become a cause of circuit failure.

When such noise reduction circuitry is incorporated in a fuel pump, failure of a single solder joint can present an open point in the power distribution circuit and effectively disable the fuel pump thereby preventing operation of the motor vehicle. Thus, a circuit intended to improve radio sound quality can produce total vehicle failure.

Obviously, it would be desirable to have a radio frequency suppression device for use in conjunction with automotive components such as a fuel pump, which device would not result in total disenablement of the fuel pump in the event of failure. The present invention provides for a radio frequency suppression device having no solder joints or capacitors disposed in series relationship in the conductive path therethrough. When used in connection with an automotive fuel pump this radio frequency suppression device provides what is called a "no walk home" feature because failure of the device merely results in the loss of radio frequency noise suppression and does not completely disable the fuel supply system for the motor vehicle. These and other features and advantages of the present invention will be readily apparent from the drawings, description and discussion which follow.

SUMMARY OF THE INVENTION

There is disclosed herein a fail-safe R.F. suppression device adapted to be interposed in series in a power supply circuit for energizing a motor. The device prevents high frequency signals produced by the motor from being transmitted onto the power supply circuit and includes first and second conductors adapted to provide electrical energy to respective first and second motor terminals, choke means associated with the first conductor and adapted to block the flow of high frequency current therethrough. The choke is further configured so as to provide a continuous current path along the entirety of the first conductor, said path having no solder joints in series therewith. The device further includes a capacitor adapted to block the flow of direct and low frequency current while passing high frequency current therethrough, disposed so as to interconnect the first and second conductors. The second conductor is adapted to provide a continuous current path along the entirety thereof, said path not having any solder joints in series therewith. In this manner the device is adapted to continue to provide power to the motor in the event of failure of the capacitor or a solder joint.

The choke may include a ferromagnetic body associated with the conductor and in particular instances, the ferromagnetic body may surround at least a portion of the length of the conductor. The ferromagnetic body may be formed of a sintered soft ferrite material and may be configured as a cylinder having a central passageway therethrough and adapted to be slid over the conductor. In another embodiment, the ferromagnetic body may be fabricated as a two-piece body having a central passageway therethrough and may be affixed to the conductor by adhesively attaching, or otherwise joining the two portions so that the conductor is retained in the central passageway.

In a particular embodiment, the choke means includes two ferromagnetic bodies affixed to the first conductor in a series, spaced apart relationship.

In a particular embodiment including two series disposed ferromagnetic bodies, the capacitor may have one lead thereof electrically connected to the first conductor at a point intermediate the two bodies and the second lead thereof electrically connected to the second conductor. The choke means and capacitor may be encapsulated as for example in a thermoplastic body and the device may further include a pair of connectors adapted to mount it upon the terminals of an electric motor so as to establish electrical communication therewith.

The present invention further includes a method of fabricating a fail-safe radio frequency suppression device including the steps of: providing a first and second continuous electrically conductive member, said members adapted to establish electrical communication between a power source and the terminals of a motor; affixing at least one ferromagnetic body to the first electrically conducted member so as to surround at least a portion of the length thereof and thereby form an R.F. choke and interconnecting the first and second conductive members with the capacitor. In this manner, the first and second conductive members each provide a current path having n solder joint in series therewith. The first and second conductive members may be provided from a single metallic body having discrete portions thereof adapted to provide such members, and the method may include a further step of severing the metallic body at some point in the fabrication of the device so as to provide discrete first and second conductive members.

BRIEF DESCRIPTION OF THE DRAWINGS

FIG. 4 is a perspective view of a R.F. suppression device of the present invention having all components thereof affixed and being partially encapsulated but not having the terminals thereof severed;

FIG. 5 is a perspective view of a completed R.F. suppression device structured in accord with the principles of the present invention; and FIG. 6 is a schematic diagram of the R.F. suppression device of the present invention.

DETAILED DESCRIPTION OF THE INVENTION

The present invention will best be understood with reference to the accompanying figures illustrating steps in the assembly of the device. It should be kept in mind that the essential feature of the present invention is that it provides for a radio frequency suppression device having a continuous current path therethrough unbroken by solder joints or components prone to failure in an open mode. The device of the present invention is adapted to continue providing electrical power to a motor or other such device in spite of failure of solder joints or components thereof because of the presence of the unbroken current path.

While there are many combinations of operations and various sequences of such combined operations which may be utilized to fabricate radio frequency suppression devices in accord with the principles of the present invention, such devices may be advantageously fabricated by beginning with a metal blank generally similar to that illustrated with reference to FIG. 1.

Figure 1:
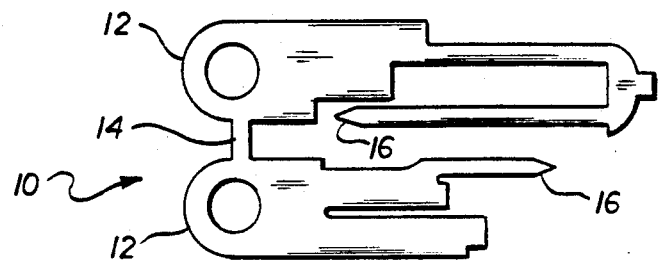
FIG. 1 is a top plan view of a metallic blank adapted to provide the first and second electrical conductors of the R.F. suppression devices as well as a pair of connection terminals for affixing the device to an electrical motor.

The blank 10 of FIG. 1 is fabricated from a metal having relatively good electrical conductivity which is also amenable to succeeding fabrication steps. It has generally been found that copper, brass or other such non-ferrous stock may be employed to fabricate the blanks 10 and may be mild steel. In some instances it may be advantageous to plate or otherwise coat the surface of the blank 10 with corrosion-inhibiting and/or conductivity-enhancing and/or solder joint-facilitating materials such as copper, zinc, and the like. The blank 10 may be advantageously fabricated by die punching or other such metal working techniques. As fabricated, the blank 10 includes two terminal portions 12 affixed by a joining tab 14 as well as a pair of connector prongs 16 for establishing electrical connection to the radio frequency suppression device.

Figure 2:
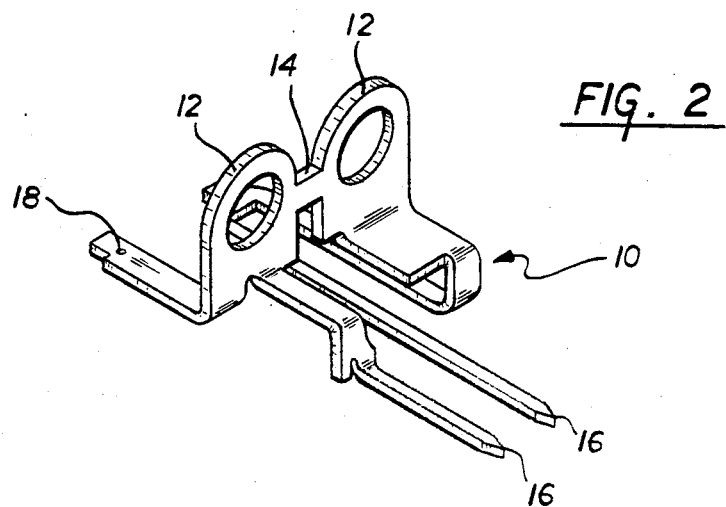
FIG. 2 is a perspective view of the blank of FIG. 1 as confined to retain various elements of the R.F. suppression device.

The blank 10 of FIG. 1 is subsequently bent to provide a base for the fabrication of the suppression device. FIG. 2 illustrates the blank 10 as thus configured. Advantageously, such bending operations may be readily accomplished by any high volume automated process well known to those of skill in the art. In a further operation, or concomitant with its fabrication, the blank 10 may be provided with various holes therethrough for the affixation of electrical components thereto. One such hole 18 is visible in a leg of the device in FIG. 2. Visible more clearly in FIG. 2 are the two connector prongs 16 as well as the terminals 12 and joining tab 14.

Figure 3:
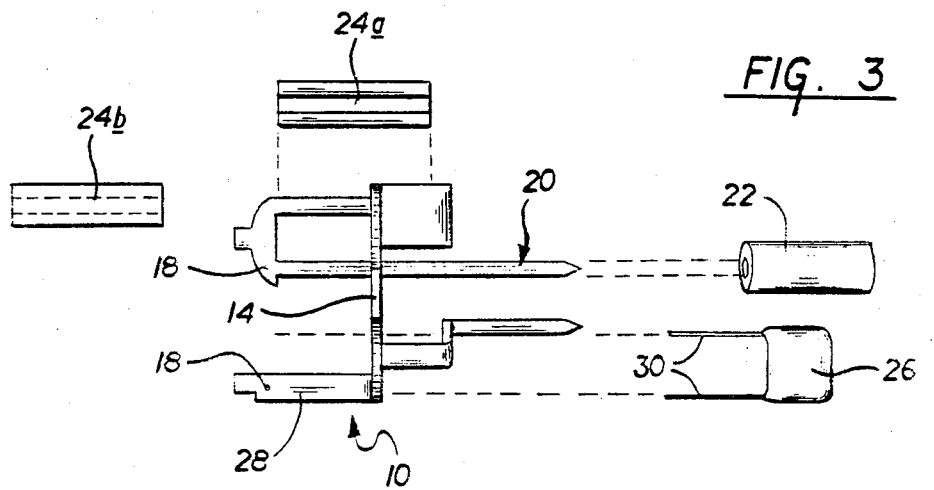
FIG. 3 is a top plan view of the configured blank of FIG. 2 illustrating the attachment of the various components of the R.F. suppression device thereto.

Referring now to FIG. 3, there is shown a top plan view of the bent blank 10 of FIG. 2 illustrating the attachment of the various components of the suppression device thereto. As mentioned previously, the blank 10 provides a first and second electrical conductor, each having a terminal 12 associated therewith and joined during construction by a tab 14. The first conductor, depicted generally by the reference numeral 20, has associated therewith a pair of R.F. chokes.

As is well-known to those skilled in the art, radio frequency chokes are basically inductance devices which restrict the passage of a high frequency alternating current therethrough while allowing relatively unimpeded passage of low frequency or direct current. Generally, such chokes take the form of coils or other high inductance devices. As depicted herein, a radio frequency choke may be fabricated by surrounding a conductor, such as the first conductor 20, with a ferromagnetic body. High frequency current passing through the conductor generates a relatively high magnetic field which penetrates and temporarily magnetizes the ferromagnetic body. This body is preferably a "soft" magnetic material, and is readily demagnetized and remagnetized to the opposite polarity as the R.F. field reverses. In this manner, the conductor and ferromagnetic body provide high resistance to a high frequency current flow.

In the FIG. 3 illustration, a first ferromagnetic body 22, depicted here as a cylindrical body having a central opening therethrough is affixed to the first conductor 20 by sliding the conductor 20 into the central passageway of the ferromagnetic body 22. It will be noted that the particular configuration of the blank 10 allows for such ready affixation. The device is provided with a second R.F. choke by affixing a second ferromagnetic body to the conductor. In this instance the second ferromagnetic body is configured as a two-piece body 24a, 24b to allow ready affixation; as for example, by the use of adhesives or the like. The second ferromagnetic body 24 is a generally rectangular body having a central passageway therethrough adapted to surround the first conductor 20 and operate in a manner similar to the first ferromagnetic body 22. For ease of fabrication, the body is generally fabricated as a rectangle, however, it will be appreciated that shapes of other cross section may be similarly employed. It will also be appreciated that the particular configuration of the blank 10 may be varied so as to allow both ferromagnetic bodies 22 24 to be slid thereonto. There are a wide variety of ferromagnetic materials which may be employed in the fabrication of the chokes including metals, alloys and metal containing compounds. It is generally desired that the material be a "soft" magnetic material so as to allow for rapid magnetization and demagnetization. One material of particular utility is soft ferrite, particularly that grade known as No. 43 to those of skill in the art.

The radio frequency suppression device is also equipped with a capacitor 26 disposed so a to join the first conductor 20 and the second conductor 28 together. As is well-known to those of skill in the electronic arts, a capacitor presents a resistance to direct and relatively low frequency currents while passing high frequency current relatively unimpeded. The capacitor 26 is disposed so as to effectively short circuit the first and second conductors 20 and 28 with respect to high frequency signals while maintaining relative electrical isolation therebetween with respect to low frequency signals. The capacitor is advantageously affixed to the first conductor 14 and the second conductor 28 by soldering the leads 30 thereof into holes 18 in each of the conductors; although it will be appreciated that other techniques such as wire bonding, wire wrapping, and the like may be similarly employed. Capacitance valves will depend upon the bond width of noise being suppressed; however, it has been found that a 0.22 MF. 250 volt capacitor may be advantageously employed.

Referring now to FIG. 4, there is shown the next stage in the fabrication of the radio frequency suppression device. FIG. 4 depicts the blank 10 having the first ferromagnetic body 22 and second ferromagnetic body 24 attached to the first conductor 20 thereof. Also visible is the capacitor 26 joining the first conductor 20 and the second conductor 28. The blank 10 having the various components attached thereto is fitted into an encapsulating shell, a first portion thereof 32 being shown in this figure.

The encapsulating shell supports the components of the R.F. suppression device and surrounds and shields the ferromagnetic bodies 24 and 22 and the capacitor 26 as well as a portion of the second conductor 28. The encapsulating body may also be configured to provide for ready attachment of the R.F. suppression device to a power supply and toward this end the portion of the encapsulating body 32 illustrated in FIG. 4 includes a socket end 34 configured so as to (1) support the prongs 16 and (2) enable ready attachment of a connector thereto. As illustrated, the socket end 34 of the encapsulating body 32a is configured to provide a slot adapted to hold a connector therein. The encapsulating body 32 is most advantageously fabricated from electrically insulating materials such as synthetic polymeric resins and the like. Obviously, the encapsulating body may be configured to provide for any mode of attachment of the R.F. suppression device to the equipment which it is used in conjunction with.

Referring now to FIG. 5, there is shown a completed R.F. suppression device generally similar to that of FIG. 4 but including a second portion of the encapsulating body 32b affixed thereto so as to house and protect the various components of the device. It will also be noted from FIG. 5 that the joining tab (14 in previous figures) has been severed from the terminals 12 so as to complete the device. In use, the completed R.F. suppression device of FIG. 5 is mounted on the power supply terminals of the electric motor or other power-consuming devices from which it is desired to prevent the emanation of radio frequency signals. Such mounting is most advantageously accomplished by use of the two terminals 12. Electrical connection is established to the terminals 12 via the connection prongs 16 which communicate with a battery, alternator, or other such power source. In this manner, the power flows through the connection prongs 16, through the R.F. suppression circuitry into the power terminals 12. Countercurrent flow of radio frequency noise from the terminal to the power supply prongs 16 is inhibited by the circuitry.

Referring now to FIG. 6, there is shown a generalized schematic diagram of the electronic circuitry of the device of FIG. 5 with the various components thereof referenced by reference numerals corresponding to those employed in the foregoing figures. The schematic diagram of FIG. 6 depicts the circuit for carrying electrical power from a power source, depicted herein as a pair of positive and negative terminals to a power-consuming device 36 such as an electric motor. Power is communicated from the positive terminal through first conductor 20 having two R.F. chokes 22,24 in series. In the present invention, the chokes 22,24 are configured to provide a current path having no solder joints in series therewith.

Electrical power is provided to the second terminal of the motor 36 by a second conductor 28 which is an unbroken conductor also having no series disposed solder joints. A capacitor 26 is disposed in parallel with the motor 36 to effectively shunt R.F. signals emanating therefrom between the two conductors. Capacitors such as capacitor 26 generally fail in an open mode, that is to say in a mode inhibiting the flow of current therethrough. Additionally, solder joints used to affix capacitors also tend to fail producing high resistance points or opens in the circuit. It will be noted from an inspection of the schematic diagram of FIG. 6 that any failure of the capacitor 26 or the solder joints affixing that capacitor will not result in interruption of power from the power source to the motor 36. The worst that will happen in the event of failure of any of the components of the R.F. suppression circuit will be a loss in radio frequency suppression. It is this feature which when applied to automotive systems, particularly to fuel delivery systems, results in what is called a "no walk home" feature.

While the present invention has been described with reference to a particularly configured radio frequency suppression device and a particular sequence of steps for the fabrication of that device, it will be readily appreciated that numerous modifications in both the device and the method of fabrication may be readily undertaken in accord with the principle of providing a radio frequency suppression device having no solder joints or capacitors in series relationship with a power supply circuit. For example, the device may be fabricated employing only a single choke. Alternatively the device may employ chokes associated with each of the conductive members, as well as more than two chokes.

It will also be appreciated that the principles disclosed herein may be also employed in conjunction with circuits other than radio frequency suppression circuits as well in applications other than automotive. Accordingly, it should be understood that the foregoing drawings, descriptions, and examples are merely meant to be illustrative of particular embodiments of the invention and not limitations upon the practice thereof. It is the following claims, including all equivalents which define the scope of the invention.

I claim:

1. A fail-safe R.F. suppression device adapted to be interposed in series in a power supply circuit for energizing a motor, so as to prevent high frequency signals produced by the motor from being transmitted onto the power supply circuit, said suppression device including:
    first and second conductors adapted to provide electrical energy to respective first and second motor terminals, each of said conductors comprised of a single unbroken metallic member not having any solder joints in series therewith
    a choke associated with at least said first conductor and adapted to block the flow of high frequency current therethrough, said choke comprising a body of ferromagnetic material surrounding a portion of the first conductor and operative to provide a continuous current path along the entirety of the first conductor, said choke having no solder joints therein or in series therewith; and,
    a capacitor adapted to block the flow of direct and low frequency current while passing high frequency current therethrough disposed so as to interconnect said first and second conductors;
    whereby said device is adapted to continue to provide power to the motor in the event of failure of the capacitor or a solder joint.

2. A device as in claim 1, wherein said ferromagnetic body is a body of sintered, soft ferrite material.

3. A device as in claim 1, wherein said ferromagnetic body is a generally cylindrical body having a central passageway and said conductor is adapted to pass through said central passageway.

4. A device as in claim 1, wherein said ferromagnetic body is fabricated as a two-piece body having a central passageway and is affixed to the conductor by joining the two portions so that the conductor is retained in the central passageway.

5. A device as in claim 1, wherein said choke means includes two ferromagnetic bodies affixed to the first conductor in spaced apart, series relationship.

6. A device as in claim 5, wherein one lead of said capacitor is electrically connected to said first conductor at a point intermediate the two ferromagnetic bodies and the second lead of the capacitor is electrically connected to the second conductor.

7. A device as in claim 1, wherein said choke and capacitor are encapsulated.

8. A device as in claim 1, further including a pair of connectors adapted to mount the device upon the motor terminals and to establish electrical communication therewith.

9. A method of fabricating a fail-safe R.F. suppression device, said method including the steps of:
    providing a first and a second continuous, electrically conductive member each unbroken by solder joints and each adapted to establish electrical communication between a power source and a terminal of the motor;
    affixing at least one ferromagnetic body to said first electrically conductive member so as to surround at least a portion of the length thereof and thereby form an R.F. choke integral with the conductive and not including any solder joint in series therewith; and
    interconnecting said first and second conductive members with a capacitor, whereby there is provided an R.F. suppression device which will conduct an electrical current therethrough in spite of failure of the capacitor, the choke or a solder joint.

10. A method as in claim 9, wherein the step of providing first and second continuous, electrically conductive members comprises providing a single metallic body having discrete portions thereof adapted to provide said first and second conductive members; and wherein the method includes the further step of,
    severing said metallic body so as to provide discrete first and second conductive members after affixation of the ferromagnetic body and the capacitor.

11. A method as in claim 9, wherein said ferromagnetic body is a generally cylindrical body having a central passageway therethrough and the step of affixing said body comprises sliding the conductive member through the central passageway.

12. A method as in claim 9, wherein said ferromagnetic body comprises a two-piece body having a central passageway therethrough and the step of affixing said body to the conductor comprises joining the two portions of the ferromagnetic body so as to retain the conductor in the central passageway.

13. A method as in claim 9, wherein the step of affixing said ferromagnetic body comprises affixing two ferromagnetic bodies to the conductor in spaced apart, series relationship.

14. A method as in claim 13, wherein the step of interconnecting said first and second members with a capacitor comprises affixing one lead of the capacitor to the first conductor at a point intermediate the two ferromagnetic bodies and affixing the second lead thereof to the second conductor.

15. A method as in claim 9, including the further step of encapsulating said ferromagnetic body and capacitor.

16. A method as in claim 9, including the further step of configuring a portion of said first and second conductive members so as to provide a pair of terminals adapted to be electrically connected to an electric motor.

17. A fail-safe R.F. suppression device adapted to be interposed in series in a power supply circuit for energizing a motor, so as to prevent high frequency signals produced by the motor from being transmitted onto the power supply circuit, said suppression device including:
    first and second electrical conductors each comprising a continuous, elongated, unbroken metallic member having no solder joints in series therewith and including a connector prong at one end operative for attachment to the vehicular power supply and a terminal portion at the other end thereof operative for attachment to a terminal of the motor so as to provide an unbroken current path thereto;

a body of a soft magnetic material surrounding the entirety of a portion of the first conductor whereby there is provided a choke having a high impedance to high frequency current and a relatively low impedance to direct and low frequency current;

a capacitor having one plate thereof electrically connected to the first conductor and a second plate thereof electrically connected to the second conductor so as to establish an electrically conductive path therebetween for high frequency current while blocking the flow of low frequency and direct current therebetween, whereby there is provided a radio frequency suppression device which will continue to provide power to the motor in the event of the failure of the capacitor or the choke.

* * * * *